US008092327B2

(12) United States Patent
Kobara et al.

(10) Patent No.: US 8,092,327 B2
(45) Date of Patent: Jan. 10, 2012

(54) TENSIONER LEVER FOR CHAIN DRIVE

(75) Inventors: Akira Kobara, Osaka (JP); Atsushi Hayami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 447 days.

(21) Appl. No.: 12/195,541

(22) Filed: Aug. 21, 2008

(65) Prior Publication Data

US 2009/0111629 A1 Apr. 30, 2009

(30) Foreign Application Priority Data

Oct. 29, 2007 (JP) ................................. 2007-280685

(51) Int. Cl.
F16H 7/08 (2006.01)
(52) U.S. Cl. .......................... 474/111; 474/101; 474/109
(58) Field of Classification Search .................. 474/109, 474/111, 112, 135, 140
See application file for complete search history.

(56) References Cited

U.S. PATENT DOCUMENTS

| 4,832,665 A * | 5/1989 | Kadota et al. ................. 474/112 |
| 4,934,987 A * | 6/1990 | Kadota et al. ................. 474/112 |
| 4,976,659 A * | 12/1990 | Hans et al. .................... 474/111 |
| 5,244,438 A * | 9/1993 | Golovatai-Schmidt ....... 474/112 |
| 5,425,680 A * | 6/1995 | Young ............................ 474/111 |
| 5,919,107 A * | 7/1999 | Stepniak ....................... 474/112 |
| 5,989,138 A * | 11/1999 | Capucci ........................ 474/109 |
| 6,238,311 B1 * | 5/2001 | Cutting ......................... 474/111 |
| 6,375,588 B1 * | 4/2002 | Frankowski et al. ......... 474/112 |
| 6,428,435 B1 * | 8/2002 | Kumakura et al. ........... 474/111 |
| 6,447,416 B1 * | 9/2002 | Jacques et al. ............... 474/111 |
| 6,572,502 B1 * | 6/2003 | Young et al. ................. 474/111 |
| 6,659,896 B1 * | 12/2003 | Stief et al. ................... 474/135 |
| 6,932,731 B2 * | 8/2005 | Kaiser et al. ................. 474/135 |
| 7,285,065 B2 * | 10/2007 | Dinca et al. ................. 474/112 |

FOREIGN PATENT DOCUMENTS

| EP | 1096174 A1 | 5/2001 |
| JP | 2000-274501 | 10/2000 |

* cited by examiner

Primary Examiner — Michael Mansen
Assistant Examiner — Henry Liu
(74) Attorney, Agent, or Firm — Howson & Howson LLP

(57) ABSTRACT

In a spring-loaded tensioner lever having a coiled torsion spring accommodated in a space inside the lever, a stopper mechanism, comprising a pin held removably in a hole in the lever, holds an arm of the torsion spring against movement in the unwinding direction while the lever, or the chain, is being mounted on a mounting surface. The pin and a bent end of the arm of the spring fit into holes in the mounting surface positioned so that a pivot shaft-receiving hole of the lever is automatically aligned with a shaft-mounting hole in the mounting surface.

4 Claims, 8 Drawing Sheets

TENSIONER LEVER FOR CHAIN DRIVE

CROSS-REFERENCE TO RELATED APPLICATION

This application claims priority on the basis of Japanese patent application 2007-280685, filed Oct. 29, 2007. The disclosure of Japanese application 2007-280685 is hereby incorporated by reference.

FIELD OF THE INVENTION

The invention relates to tensioner lever for use in a chain drive, i.e., a chain transmission in which an endless chain transmits rotation from a driving sprocket to one or more driven sprockets. A valve timing transmission in an automobile engine is a typical application for a chain drive. The invention relates particularly to a tensioner lever of the kind in which a torsion spring resiliently presses the sliding contact surface of a shoe against the chain to prevent slack in the chain.

BACKGROUND OF THE INVENTION

In a chain drive such as the timing drive of automobile engine, slack in the chain can be removed, and vibration can be prevented, by a pivoted tensioner lever comprising a lever having a shoe surface in sliding contact with the chain. In such a tensioner lever, the shoe surface can be pressed against the chain by a coiled torsion spring interposed between the lever and a mounting surface.

A typical example of such a tensioner lever is shown in FIGS. 7 and 8, and described in U.S. Pat. No. 6,428,435, granted on Aug. 6, 2002. In the tensioner lever 500, an internal space 502B accommodates the wound portion 531 of a coiled torsion spring 530. The tensioner lever is formed with an opening 502A, through which the spring 530 can be incorporated into the internal space 502B. A boss 503, having an outer circumferential surface F, on which the wound portion 531 of the spring fits loosely, extends into space 502B from an outer wall of the lever. An arm 533 of the spring extends through a cut-out portion T in a part of the wall of the lever surrounding the coil spring. A laterally protruding end of the arm 533 extends into a hole h in a mounting surface R so that the end of the arm 533 is fixed, and torque can be exerted by the opposite end of the spring, urging the shoe surface S of the lever against a chain. The coil spring 530 can be incorporated into the lever 501 before the lever is mounted on mounting surface R.

In the process of mounting the conventional lever of FIGS. 7 and 8 on a mounting surface, the coil spring is first incorporated into the lever. Then, the protruding end of spring arm 533 is inserted into hole h in the mounting surface. The strong force exerted by the spring makes it difficult to align the shaft hole H in the boss with a hole N provided in the mounting surface R for receiving a mounting bolt 510. A related problem arises when the lever is mounted before the installation of the chain. The lever can be mounted without difficulty, but the spring causes the lever to pivot in a direction such that it interferes with the installation of the chain.

An object of the invention is to solve the above-described problem or by providing a spring-operated tensioner lever which can be mounted more easily.

SUMMARY OF THE INVENTION

The tensioner lever in accordance with the invention comprises a pivotally mountable lever having an elongated shoe surface for sliding contact with a traveling transmission chain. A mounting hole is formed in the lever adjacent a first end of the elongated shoe surface for receiving a pivot shaft on which said lever can be pivotally mounted. A torsion spring installed on the lever has a coiled portion, and a first arm, extending from one end of the coiled portion and engaged with the lever for urging the sliding contact surface of the lever against a chain. The lever has an end wall to which the shoe surface is substantially perpendicular, and a side wall extending from the end wall, the side wall and the end wall forming boundaries of an internal space within the lever. A boss extends, along a pivot axis, perpendicularly from the end wall into the internal space. The mounting hole is formed coaxially in the boss, and the boss is surrounded by the coiled portion of the torsion spring.

The torsion spring has a second arm extending from the opposite end of the coil. A cut-out portion is formed in the side wall of the lever, and the second arm extends through the cut-out portion, and has a protrusion for anchoring the second arm of the coil spring to a mounting surface. A removable stopper, engaged with the lever and with the second arm of the torsion spring, temporarily maintains torsion in the coil spring while the tensioner lever, with the torsion spring installed thereon, is being mounted on a mounting shaft.

When engaged with the second arm of the spring, the removable stopper is positioned so that it maintains in the spring a degree of torsion exceeding the degree of torsion in the spring when the second arm is anchored on a mounting surface and the sliding contact of the surface is in sliding engagement with a transmission chain.

The stopper is preferably a removable pin, and the lever preferably includes a pin-receiving hole, in which the pin is held when engaged with the second arm. The pin-receiving hole extends parallel to the lever's pivot axis, so that the pin can be removed from the pin-receiving hole by pulling the pin in a direction parallel to the pivot axis.

An end of the cut-out portion remote from the pin-receiving hole, preferably has an engagement recess for receiving the second arm of the spring and preventing the second arm of the spring from moving away from the lever when the lever is not mounted and the second arm is not engaged by the pin. The cut-out portion is also preferably formed with a hook adjacent the pin-receiving hole, the hook being positioned to engage the second arm of the spring and prevent the second arm of the spring from moving away from the lever when the second arm is engaged by the pin.

In accordance with another aspect of the invention, when the tensioner lever is incorporated into a chain drive, a pivot shaft extends from a mounting surface, and a second pin-receiving hole is provided in the mounting surface. The second pin-receiving hole is alignable with the pin-receiving hole of the lever when the lever is mounted with the pivot shaft extending through the mounting hole of the lever. The removable pin can extend through the pin-receiving hole of the lever and into the second pin-receiving hole in the mounting surface.

The coiled torsion spring can be incorporated into the lever before the lever is mounted onto a mounting surface, and the parts can be handled easily during mounting of the lever.

The stopper holds the second arm portion of the torsion spring, against the force exerted by the spring, in a position such that, even if the transmission chain is already in place, the second arm portion can be easily anchored on a mounting surface while the lever is being mounted on its pivot shaft.

When the stopper is a removable pin engaged with a pin-receiving hole and arranged so that it can be pulled out in a direction parallel to the axis of the pivot shaft, the stopper mechanism can be a very simple structure, and the pin can be easily separated from the lever after the lever is mounted and the pin is no longer needed.

Furthermore, when the protrusion of the second arm of the spring fits into an anchoring hole in the mounting surface and the end of the stopper pin fits into a positioning hole in the mounting surface, the mounting hole of the lever and a hole in the mounting surface into which a pivot shaft can be fitted can be automatically aligned with each other, making mounting of the lever assembly particularly easy.

The engagement recess in the lever can hold the second arm of the torsion spring when the stopper is not in place, preventing the spring from falling out of the lever.

The hook at one end of the cut-out portion of the lever similarly prevents the torsion spring from falling out of the lever when the stopper is in place.

DESCRIPTION OF THE PREFERRED EMBODIMENTS

Figure 1:
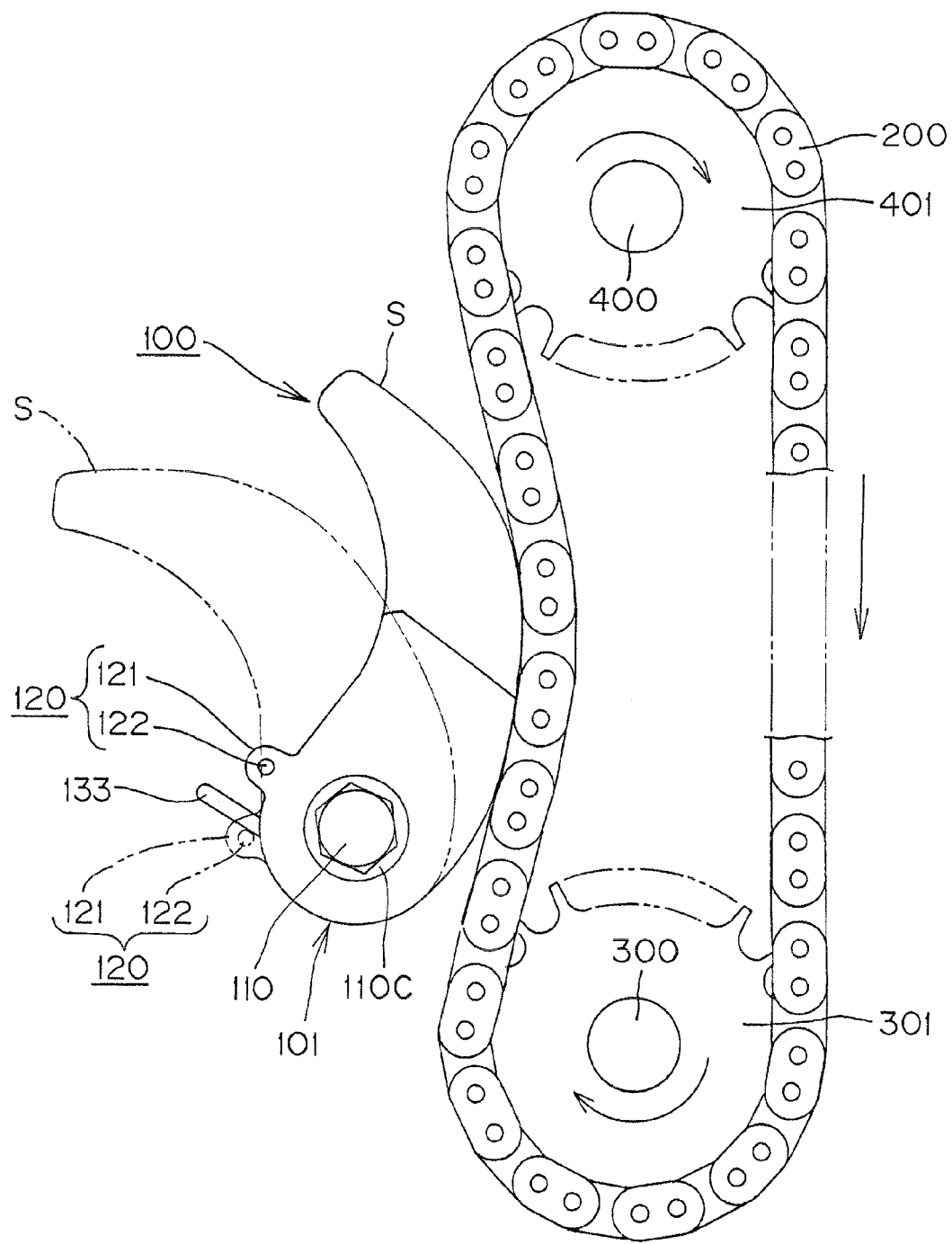
FIG. 1 is an elevational view of a chain transmission incorporating a tensioner lever according to the invention.

The invention enables the tensioner lever and torsion spring to be assembled prior to mounting of the lever, and because the torsion spring is pre-tensioned by the stopper, the spring is prevented from interfering with the mounting of the lever or of a chain to be engaged by the lever.

The lever can be composed of any of various materials suitable for smooth sliding engagement with a traveling transmission chain. Examples of preferred materials include, synthetic resins such as polyamide 6, polyamide 46, polyamide 66, polyacetal resin, and the like. These synthetic resins can also be utilized as coverings on the surface of a lever base composed of metal such as aluminum, or of a rigid, non-metallic material such as glass fiber-reinforced polyamide resin.

The tensioner lever 100, shown in FIGS. 1 to 6, comprises and elongated molded resin lever 101, having a proximal end pivotally supported on a pivot shaft 110 extending outward from the mounting surface R of an engine.

As shown in FIG. 1, the lever 101 is formed with an elongated shoe surface S, at least part of which comes into siding contact with the slack side of an endless transmission chain 200 on the outside of the loop formed by the chain. The chain is in mesh with a driving sprocket 301, mounted on a crankshaft 300, and a driven sprocket 401, mounted on a shaft 400 for driving auxiliary equipment. The pivoted lever 101 is biased against the chain 200 about the pivot shaft 110 so that its shoe surface S presses against the chain to prevent slack.

Figure 3:
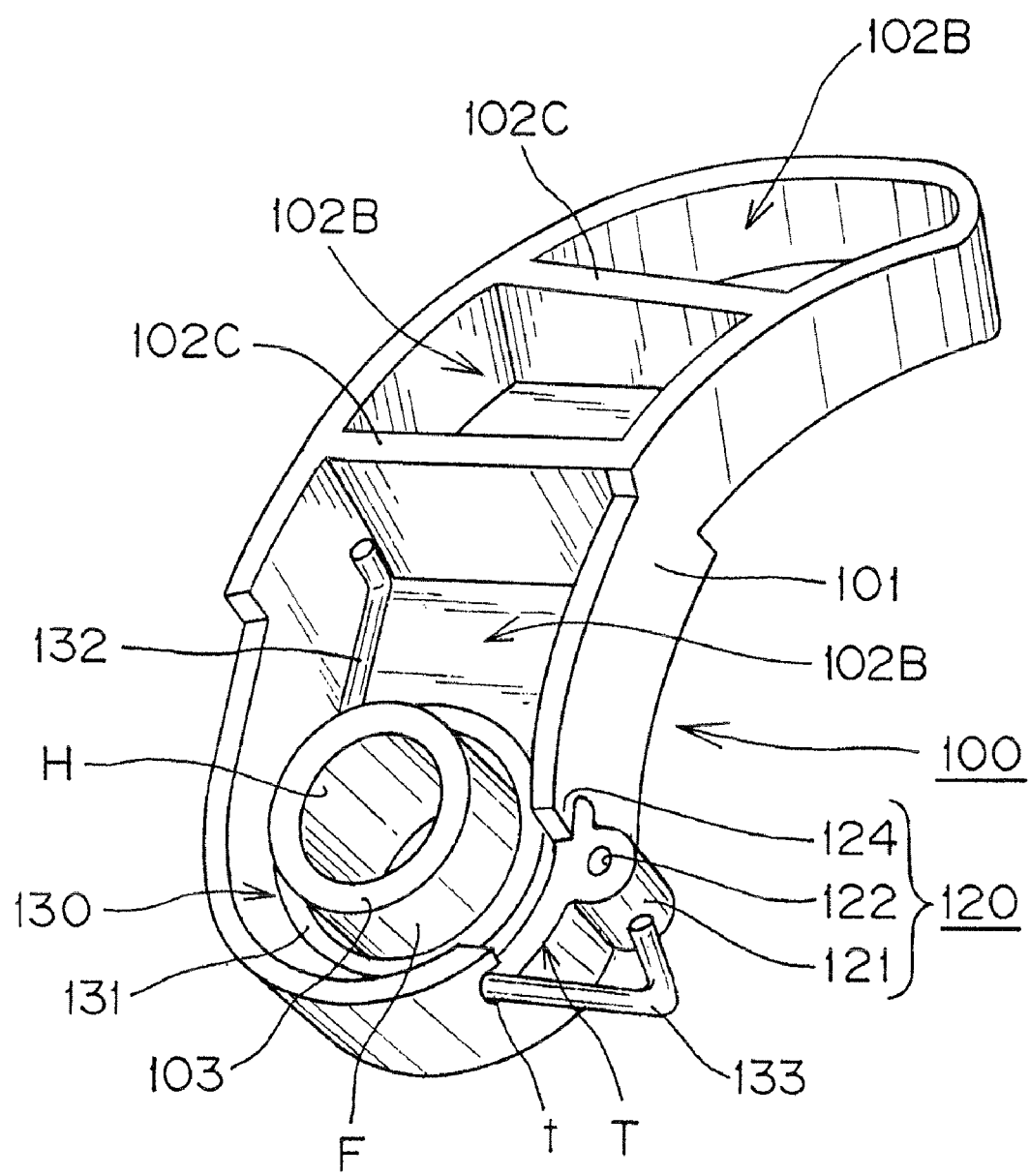
FIG. 3 is a perspective view showing the opposite side of the tensioner lever.
Figure 6:
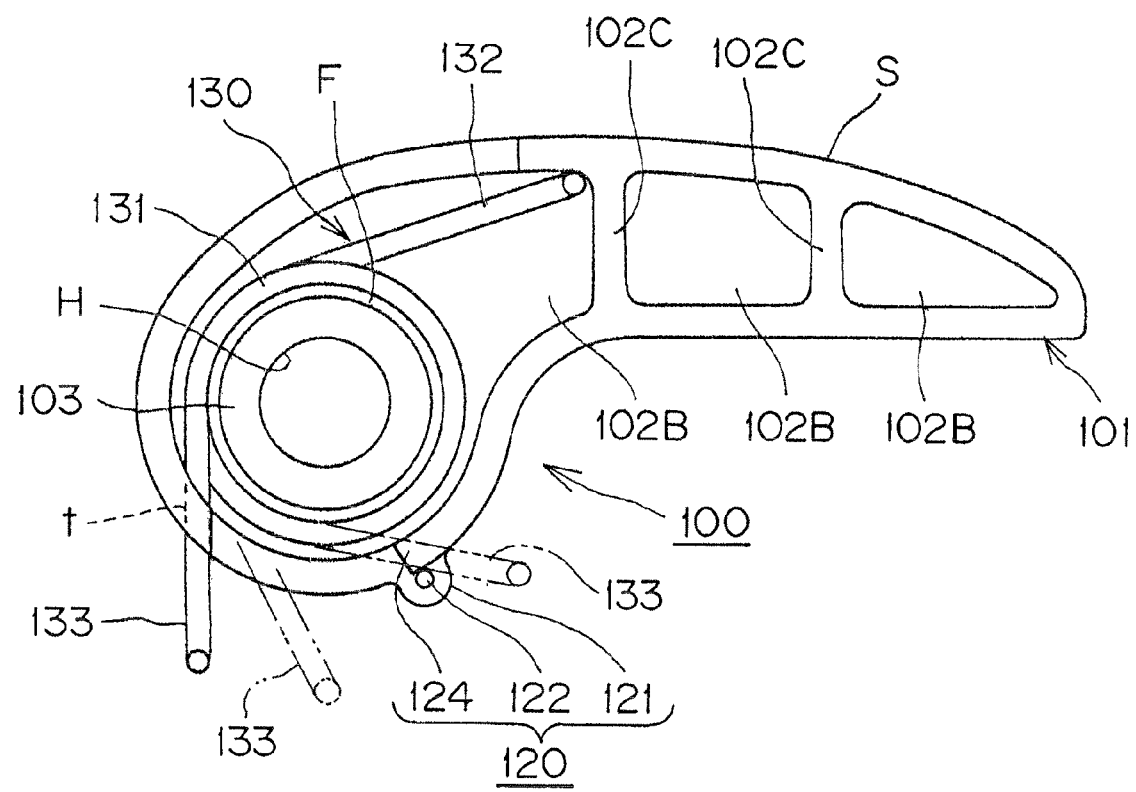
FIG. 6 is an elevational view of the tensioner lever as seen from the rear of FIG. 1.
Figure 7:
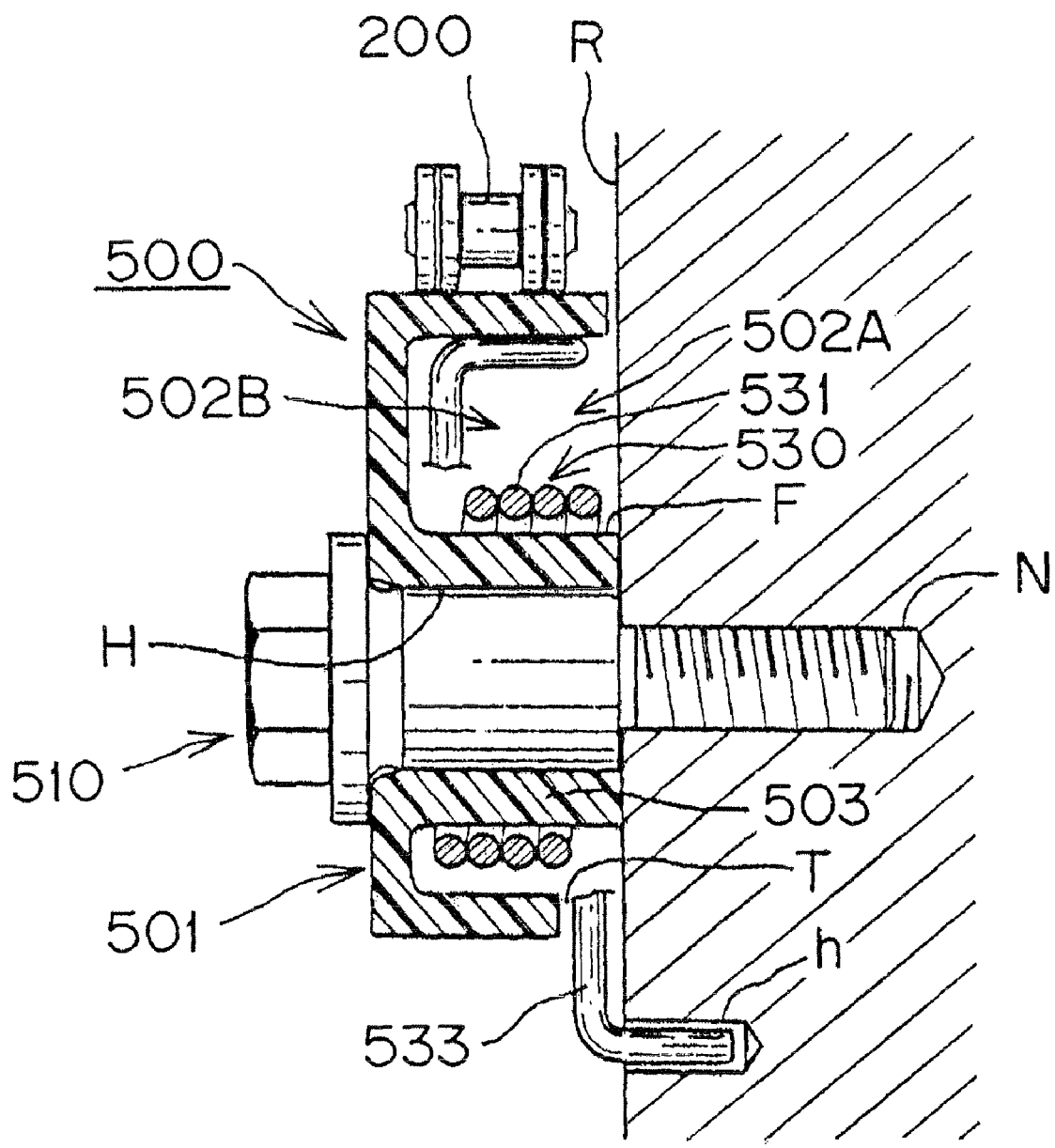
FIG. 7 is a cross-sectional view of a conventional tensioner lever.
Figure 8:
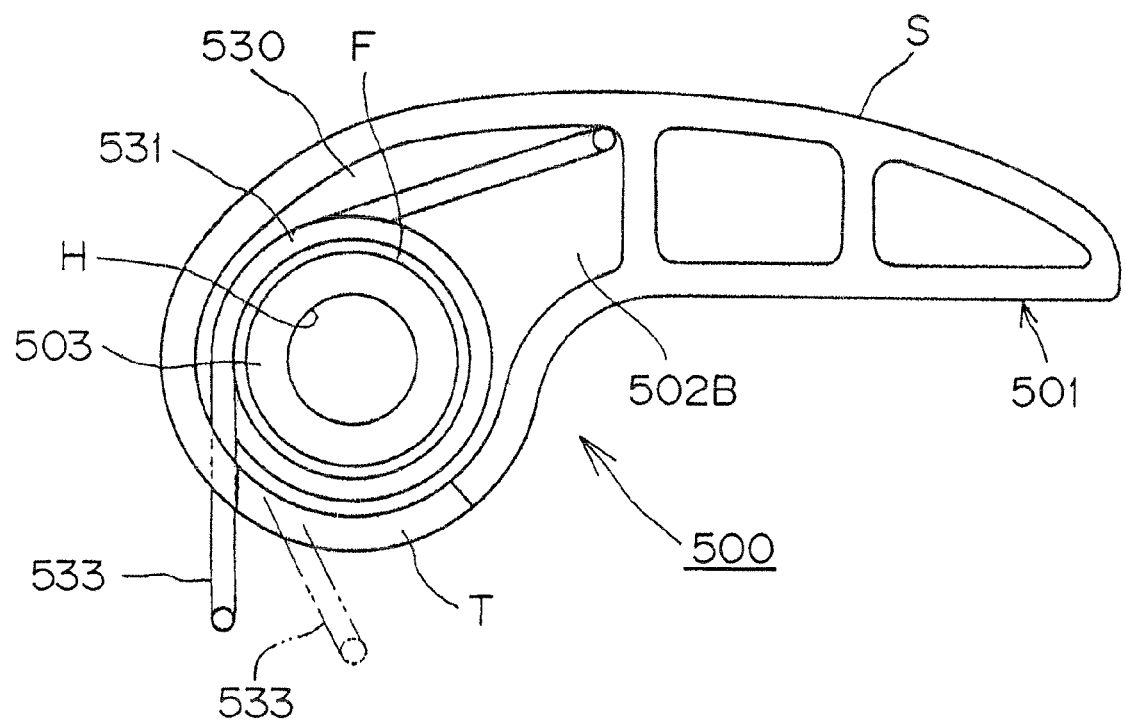
FIG. 8 is a an elevational view of the conventional tensioner lever.

As shown in FIGS. 3 and 6, the lever 101 is provided with an internal space 102B, which is divided, by reinforcing ribs 102C, into a plurality of sections, arranged adjacent one another along the length of the lever. The sections 102B have openings 102A (FIG. 4) which face the mounting surface R. Thus, the lever has an end wall opposite openings 102A and a side wall extending in perpendicular relationship to the end wall, the side wall and the end wall forming boundaries of the internal space 102B. The shoe is formed by a part of the outside surface of the side wall.

Figure 4:
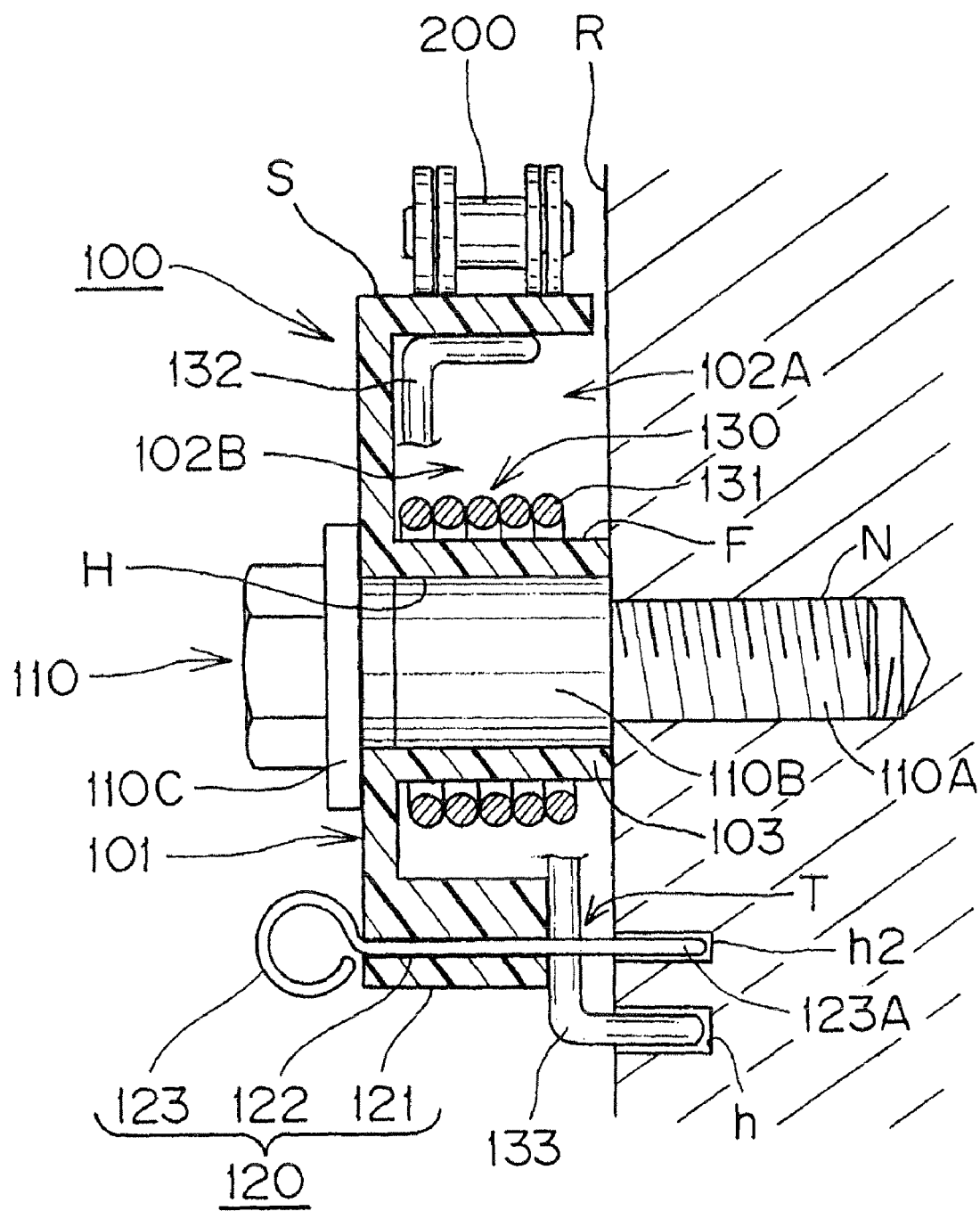
FIG. 4 is a cross-sectional view of the tensioner lever taken on section plane 4-4 in FIG. 1.
Figure 5:
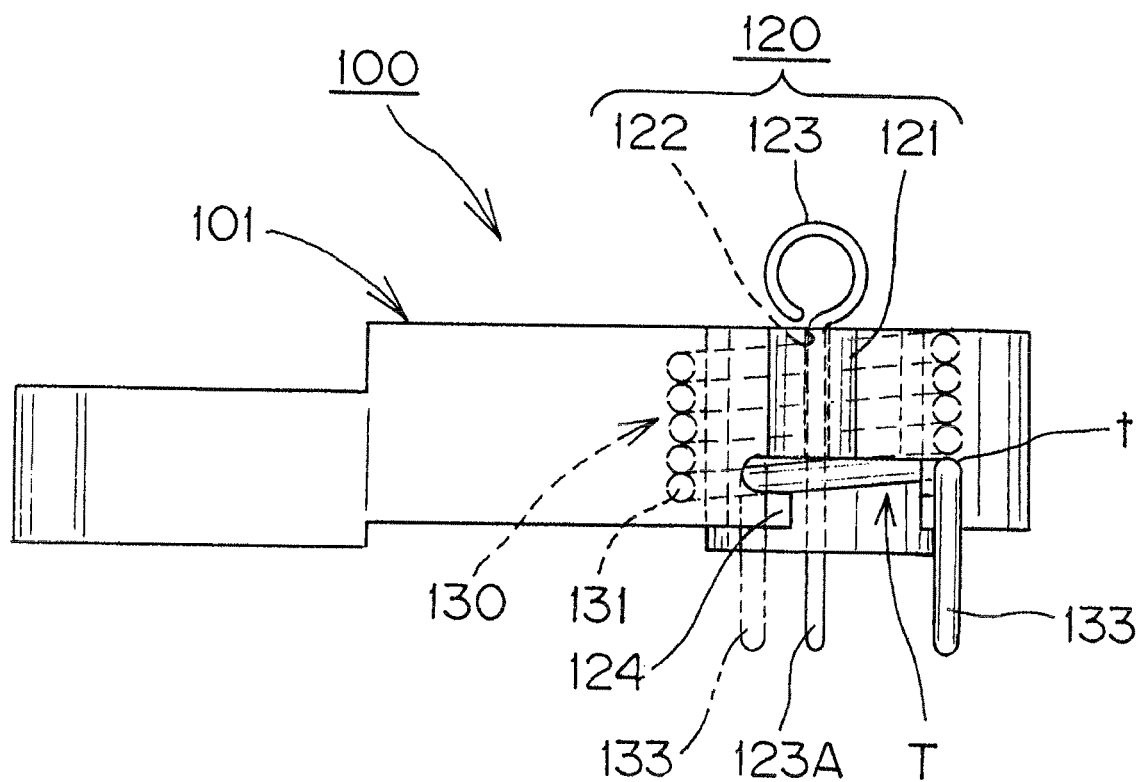
FIG. 5 is a side elevational view of the tensioner lever, as seen from the left side of FIG. 1.

As shown in FIG. 4, the pivot shaft 110 is preferably formed by a shoulder bolt having a collar 110C. A portion 110A of the shoulder bolt is threaded into a hole N formed in the mounting surface R, thereby fixing the pivot shaft to the mounting surface.

A boss 103 having a hole H, through which the cylindrical shoulder 110B of pivot shaft 110 is inserted, is formed as a unit with the lever and extends from the end wall of the lever 101 through internal space 102B, protruding slightly beyond the opening 102A and contacting mounting surface R. Thus, when the lever 101 pivots on shaft 110, portions of the lever other than the end surface of the boss do not come into contact with the mounting surface R, and the lever can pivot smoothly on shaft 110 without backlash. The collar 110C on the pivot shaft 110 limits movement of the lever 101 in the direction of the axis of the pivot shaft 110.

A coiled portion 131 of a torsion spring 130 is wound loosely on the outer circumferential surface F of the boss 103, which is coaxial with hole H in the boss.

An arm 132 of the torsion spring, which is continuous with the coiled portion 131 of the torsion spring 130, is bent toward an opening 102A, as shown in FIGS. 3, 4, and 6, so that it can press against the inside of a portion of the side wall of the lever on which the shoe surface is formed.

An arm 133, at the opposite end of the spring and also continuous with the coiled portion 131, extends through a cut out portion T formed in the side wall of the lever adjacent an opening 102A, so that a part of arm 133 extends outside the lever 101. The end of the arm is bent toward the mounting surface R and is inserted into a retaining hole h in the mounting surface, as shown in FIG. 4.

When the end of arm 132 is engaged with the inner wall of the lever, and end of arm 133 is inserted into retaining hole h, the torsion spring 130 generates a torque, biasing the lever about its pivot shaft 110, clockwise in FIG. 1, so that the shoe surface S of the lever presses against chain 200.

As shown in FIGS. 2 to 6, the cut out portion T subtends and angle of about 60E about the center of the shaft hole H. As shown in FIG. 6, the arm 133 of the torsion spring can be brought to a position within the cut-out T at which it is located beyond a through hole 122 in a stopper pin holding protrusion 121 of a stopper mechanism 120. The through hole 122 extends parallel to the axis of hole H, and can receive a stopper pin 123, as shown in FIG. 4. The stopper pin 123 is inserted into the stopper pin through hole 122. The tension in the coil 131 urges arm 133 toward the end of the cut-out T remote from the stopper pin-receiving through hole 122 as shown in FIG. 3. However, if the arm 133 is moved to the opposite end of the cut-out and the stopper pin 123 is inserted into hole 122, as shown in FIG. 4, the arm can be held by the pin in the rightmost position illustrated in FIG. 6.

As shown in FIG. 3, a hook 124 is formed in the side wall of the lever at the end of cut-out T adjacent the stopper holding protrusion 121. When the arm 133 is held by the stopper pin at the end of the cut-out T adjacent protrusion 121, the hook 124 prevents the arm 133 from moving out of the lever through the opening 120A. Thus, the arm 133 of the spring is securely held against movement in all directions, and the spring is prevented from falling out of the lever.

As shown in FIG. 4, the mounting surface R is provided with a positioning hole h2. The length of the stopper pin 123 is such that, when the stopper pin 123 is inserted into the stopper pin through hole 122 to hold the arm 133 at one end of the cut-out T against the tendency of the coil to unwind, the pin can enter the positioning hole h2. With the end of pin 122 in positioning hole h2 and the bent portion of arm 133 retained in hole h, the hole H in the boss 103 of the lever can be aligned with the hole N, and the shoulder bolt can be easily threaded into hole N.

Figure 2:
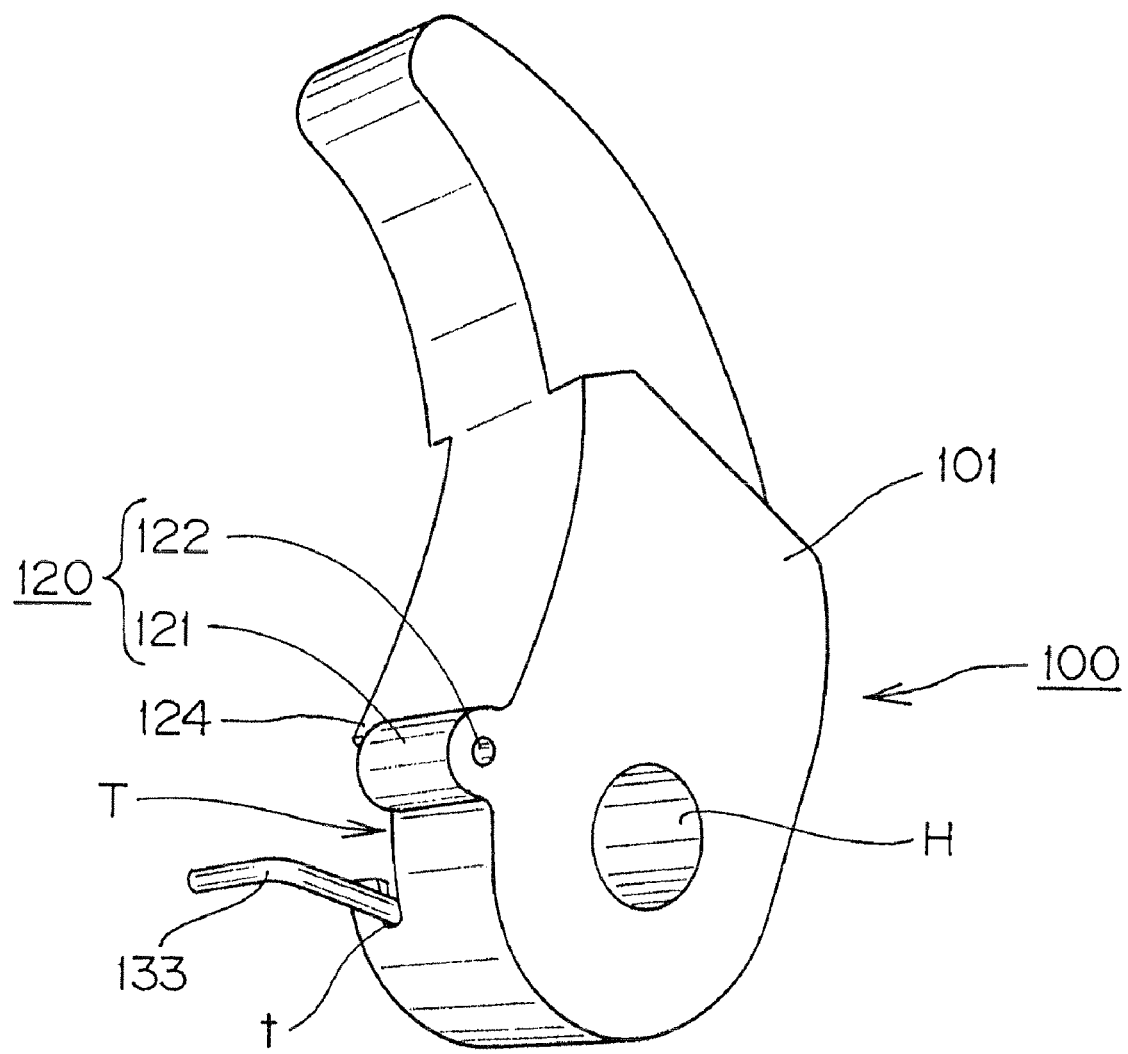
FIG. 2 is a perspective view showing a first side of the tensioner lever.

As shown in FIGS. 2, 3 and 6, arm 133 of the torsion spring 130 is held in an arc-shaped recess t formed at an end of cut-out T remote from the stopper pin-holding protrusion 121 on the lever. The engagement of the arm 133 in the recess t prevents the spring from falling out of the lever during assembly, before the arm 133 is engaged with the stopper.

The recess t in the lever affords advantages in parts management. In the assembly of the lever 101, the torsion spring 130 is incorporated into the lever. As shown by solid lines in FIGS. 2, 3, 5 and 6, the arm 133 is initially engaged the arc-shaped recess t at one end of the cut-out T. Levers with torsion springs installed in them in this manner can be stocked for future use, and transported, without the risk that their springs will separate from the lever bodies.

Before mounting the tensioner lever on surface R, the arm 133 of the torsion spring 130 is moved to the opposite end of the cut-out T as depicted by dotted lines in FIG. 6. In this process, the coil spring becomes more tightly wound. The stopper pin 123 is then inserted into the through hole 122 in protrusion 121. As shown by dotted lines in FIGS. 5 and 6, the arm 133 of the torsion spring 133 is held by the stopper pin at the end of cut-out T adjacent protrusion 121.

As shown by dotted lines in FIG. 1, while the arm 133 of the torsion spring 130 held by the stopper pin at the end of the cut out T adjacent protrusion 121, the lever can be positioned out of contact with the chain. As shown in FIG. 4, the bent end of the arm 133 fits into the spring-holding hole h in the mounting surface R, and the end 123A of the stopper pin 123 fits into positioning hole h2.

Holes h and h2 are positioned so that when the end of arm 133 is in hole h, and the end of the stopper is in hole h2, the shaft-receiving hole H of the lever 101 is aligned with hole N in the mounting surface. The shoulder bolt can then be inserted through hole H and threaded into hole N to mount the lever on surface R.

Since the arm 133 of the coil spring 130 is held at the end of cut-out T adjacent protrusion 121, the lever is held away from the chain, and the shoulder bolt can be inserted through hole H and threaded into hole N without interference by the chain, if the chain is already in place. Conversely, if the lever is mounted before the chain is engaged with its sprockets, and held away from the chain position by the stopper mechanism, the chain can be easily installed without interference from the lever.

After the pivot shaft 110 is inserted through the hole H of the lever 101 and threaded into hole N in the mounting surface R, the stopper pin 123 is pulled out from the pin-receiving hole 122. The lever will then rotate clockwise about the pivot shaft to the position as shown by solid lines in FIG. 1, until it engages and takes up the slack in the chain 200 by virtue of the torsion exerted by the torsion spring 130. The installation of the tensioner lever 100 onto the mounting surface R is then complete.

In summary, since the torsion spring 130 is incorporated into the lever, and its arm 133 is temporarily held by the stopper, the lever can be held in a fixed position away from the chain during mounting of the lever or during installation of the chain. Accordingly the lever or chain can be installed in an easy operation.

Furthermore, since the stopper mechanism 120 is composed of a stopper pin 123 and a stopper holding protrusion 121, and the stopper pin 123 can be pulled out in a direction parallel to a pivot shaft 110, the stopper mechanism can be a simple structure, and the stopper pin 123, which is unnecessary following installation of the chain and lever, can be easily separated from the lever.

Moreover, when the stopper pin extends through the hole in protrusion 121 of the lever, and its end 123A is inserted into positioning hole h2, the positions of the shaft hole H of the lever 101 and the hole N can be automatically aligned without difficulty and without the aid of special additional alignment structure.

The hook 124, in cooperation with the stopper pin prevents movement of the arm 133 of the spring in all directions, ensuring that the spring is firmly held in the lever until the stopper pin is removed to release the lever, allowing its shoe surface to come into engagement with the chain.

Finally, since the recess t at the other end of the cut-out T engages the arm, falling out of the spring from the lever is prevented when the lever/spring assembly is not mounted and the stopper is not present.

We claim:

1. A tensioner lever for a chain drive comprising a pivotally mountable lever having an elongated shoe surface for sliding contact with a traveling transmission chain, a mounting hole adjacent a first end of the elongated shoe surface for receiving a pivot shaft on which said lever can be pivotally mounted, and a torsion spring installed on the lever, the spring having a coiled portion and a first arm, extending from one end of the coiled portion, engaged with the lever for urging the sliding contact surface of the lever against a chain, said lever having an end wall to which the shoe surface is substantially perpendicular, a side wall extending from the end wall, the side wall and the end wall forming boundaries of an internal space within the lever, a boss extending, along a pivot axis, perpendicularly from the end wall into said internal space, said mounting hole being formed coaxially in said boss and the boss being surrounded by a coiled portion of said torsion spring;

said torsion spring having a second arm extending from the opposite end of the coil;

a cut-out portion formed in said side wall, the second arm extending through the cut-out portion, and having a protrusion for anchoring the second arm of the coil spring to a mounting surface; and a removable stopper, engaged with the lever and with said second arm of the torsion spring, for temporarily maintaining torsion in the coil spring while the tensioner lever, with the torsion spring installed thereon, is being mounted on a mounting shaft;

in which the stopper is a removable pin;

in which the lever includes a pin-receiving hole in which said pin is held when engaged with said second arm, the pin-receiving hole extending parallel to said pivot axis, whereby the pin can be removed from the pin-receiving hole by pulling the pin in a direction parallel to said pivot axis;

in which the cut-out portion formed in said side wall has an edge a part of which is in the form of a hook adjacent said pin-receiving hole, the hook being positioned to engage said second arm of the spring and prevent the second arm of the spring from moving away from the lever when the second arm is engaged by the pin, and in which the cut-out portion has a clearance through which said second arm of the spring can pass by movement toward said end wall in a direction parallel to said pivot axis during installation of the spring in the lever.

2. A chain drive incorporating a tensioner lever according to claim 1, the chain drive including a mounting surface, a pivot shaft extending from said mounting surface, and a second pin-receiving hole in said mounting surface, the second pin-receiving hole being alignable with the pin-receiving hole of the lever when the lever is mounted with the pivot shaft extending through the mounting hole of the lever.

3. A chain drive incorporating a tensioner lever according to claim 1, including a mounting surface, a pivot shaft extending from said mounting surface, the lever being mounted with the pivot shaft extending through the mounting hole of the lever, and a second pin-receiving hole in said mounting surface, the second pin-receiving hole being aligned with the pin-receiving hole of the lever, and the pin extending through the pin-receiving hole of the lever and into said second pin-receiving hole.

4. A chain drive incorporating a tensioner lever according to claim 1, wherein said part of said edge in the form of a hook is a unitary part of said side wall of the lever.

* * * * *